March 12, 1968  J. A. AMORI  3,372,722
APPARATUS FOR DRUPE HALVING AND PITTING
Original Filed May 25, 1964   6 Sheets-Sheet 1
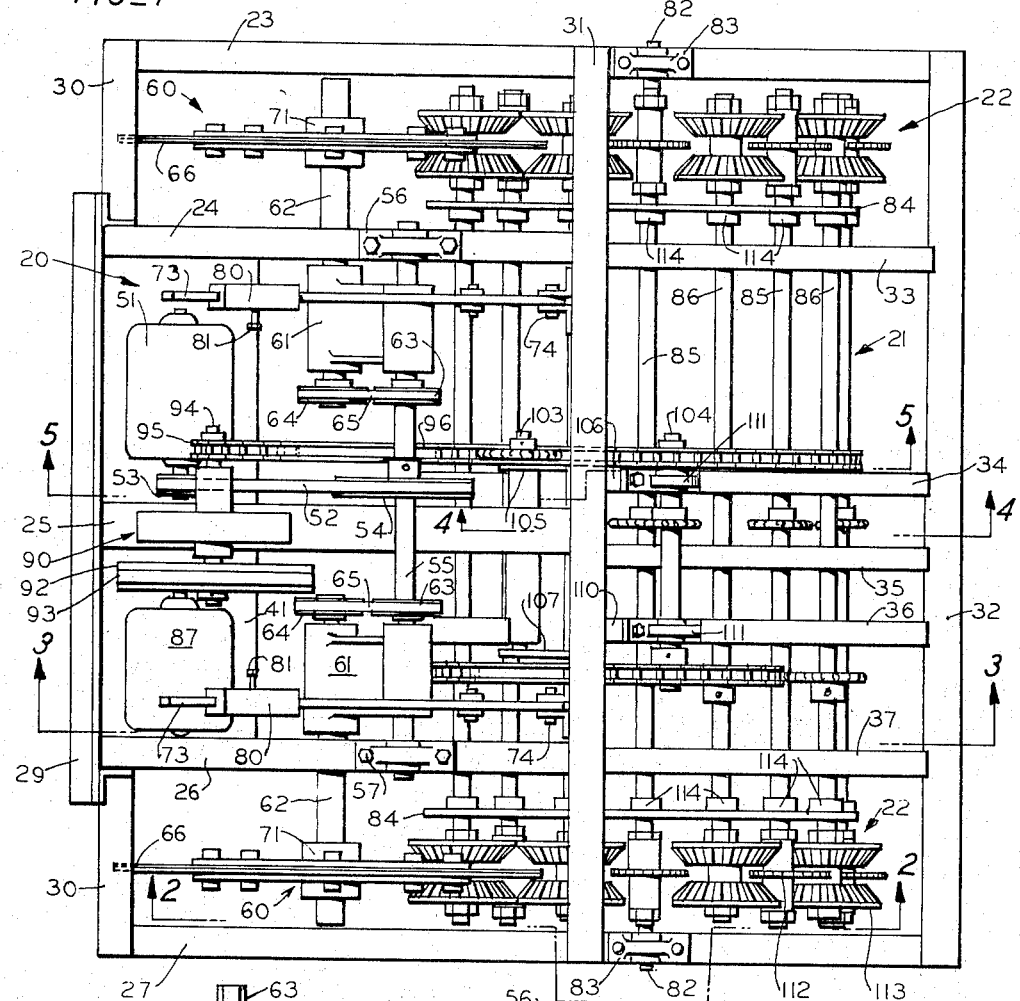
INVENTOR.
JOSEPH A. AMORI
BY Naylor & Neal
ATTORNEYS

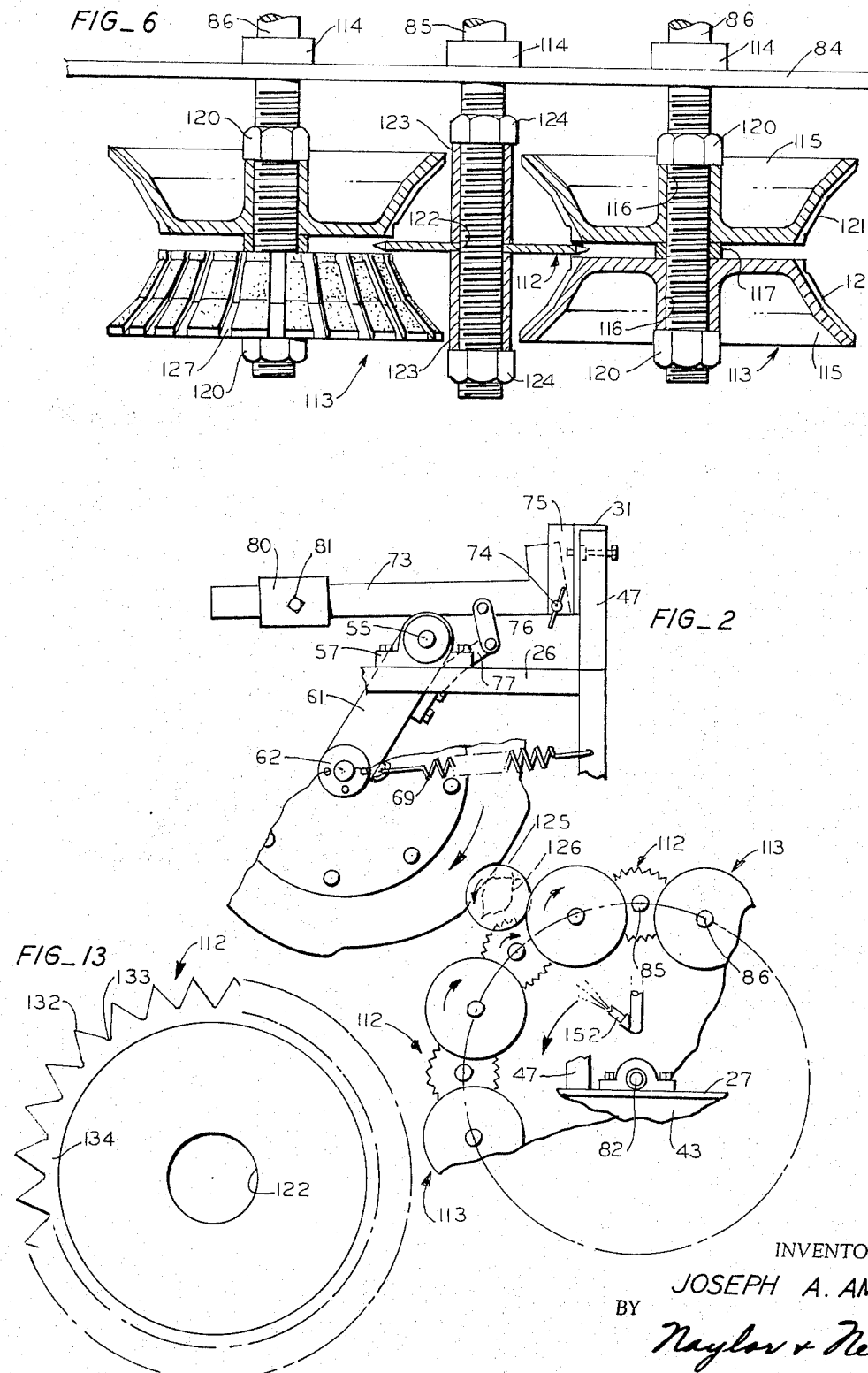

March 12, 1968    J. A. AMORI    3,372,722
APPARATUS FOR DRUPE HALVING AND PITTING
Original Filed May 25, 1964    6 Sheets-Sheet 3
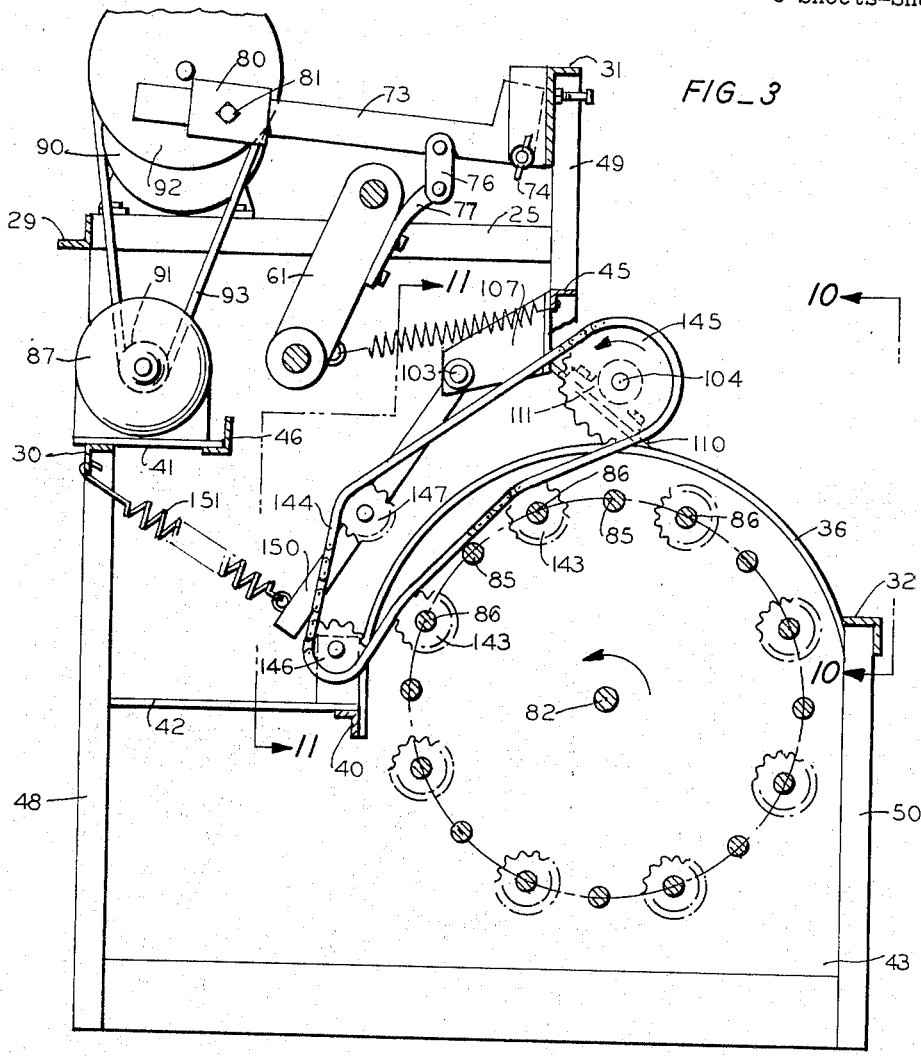
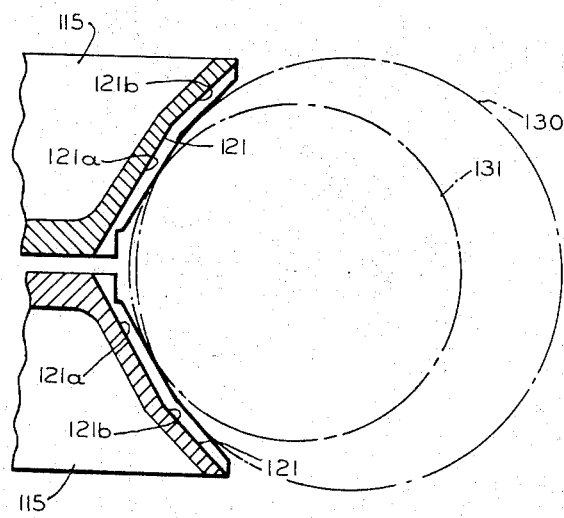
INVENTOR.
JOSEPH A. AMORI
BY Naylor & Neal
ATTORNEYS

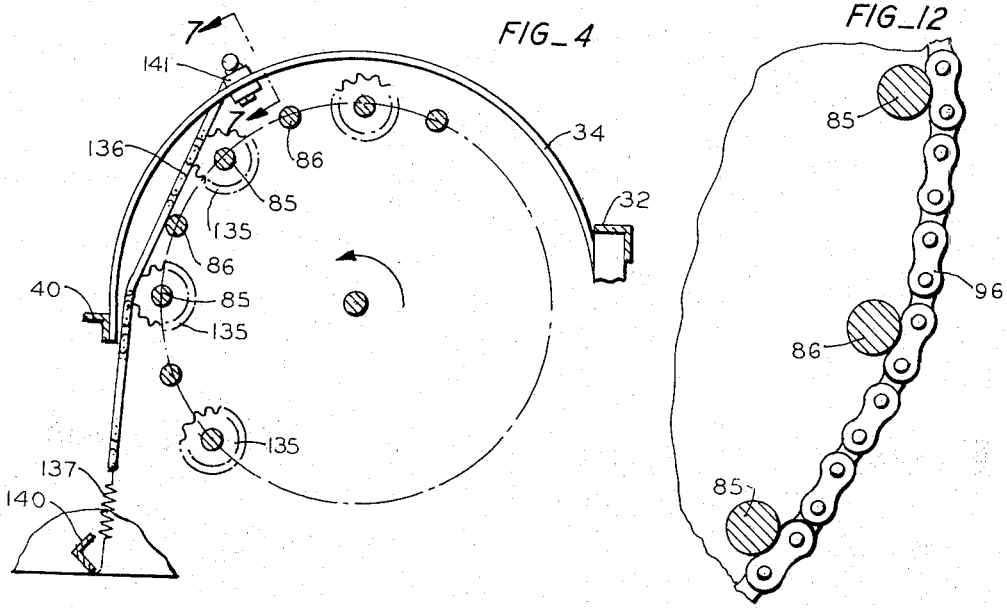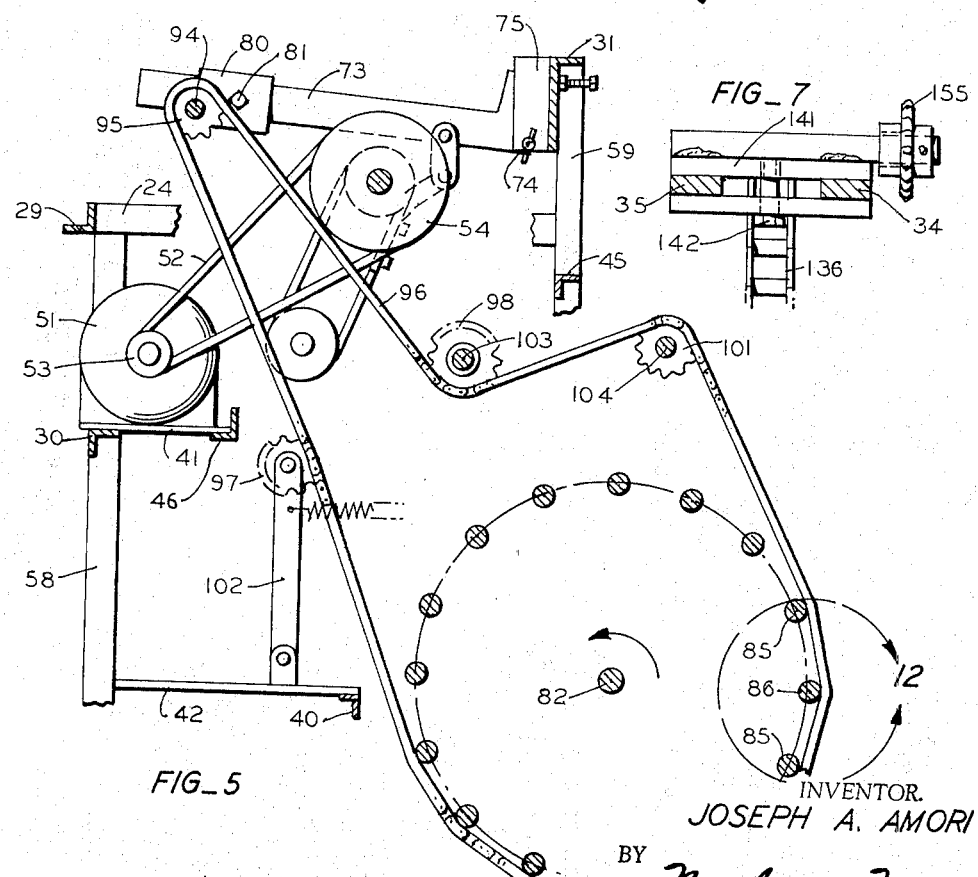

March 12, 1968   J. A. AMORI   3,372,722
APPARATUS FOR DRUPE HALVING AND PITTING
Original Filed May 25, 1964   6 Sheets-Sheet 5
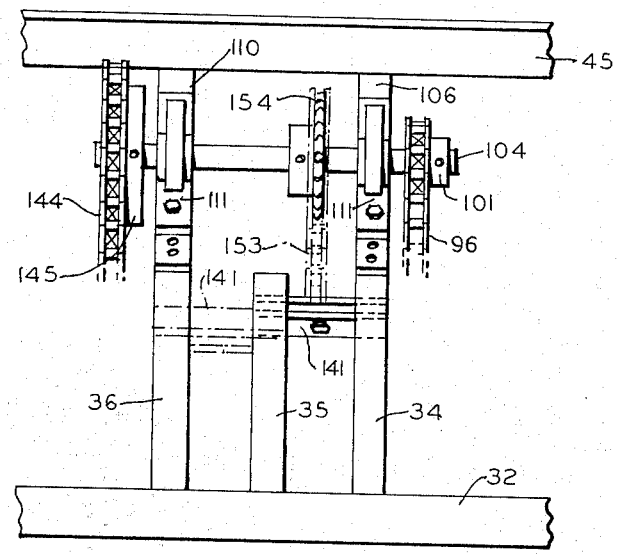
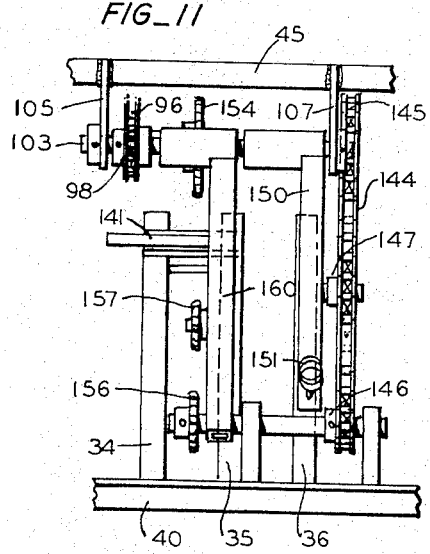
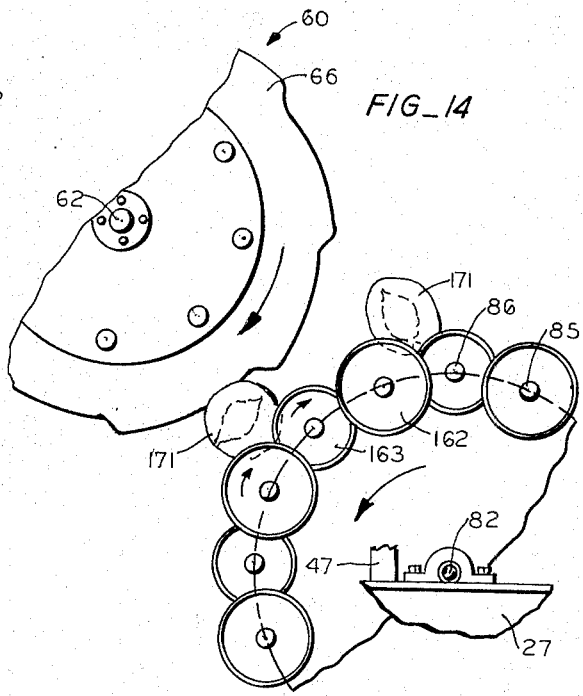
INVENTOR.
JOSEPH A. AMORI
BY Naylor & Neal
ATTORNEYS March 12, 1968  J. A. AMORI  3,372,722
APPARATUS FOR DRUPE HALVING AND PITTING
Original Filed May 25, 1964  6 Sheets-Sheet 6
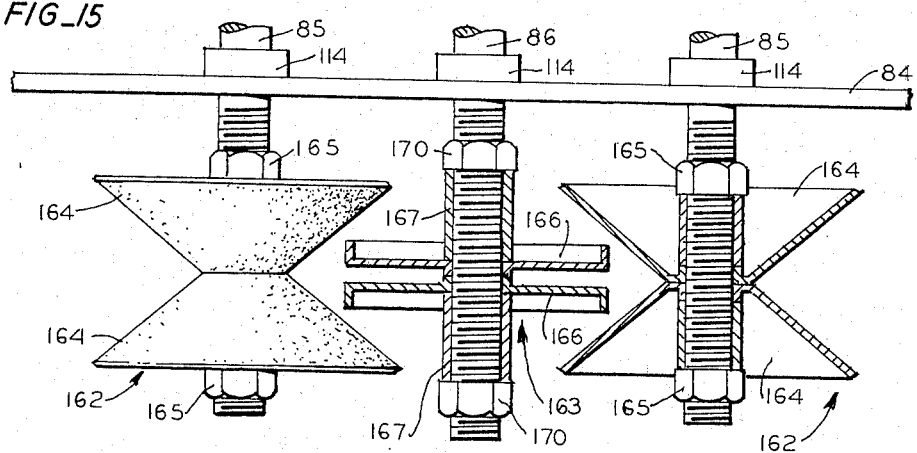
FIG_15
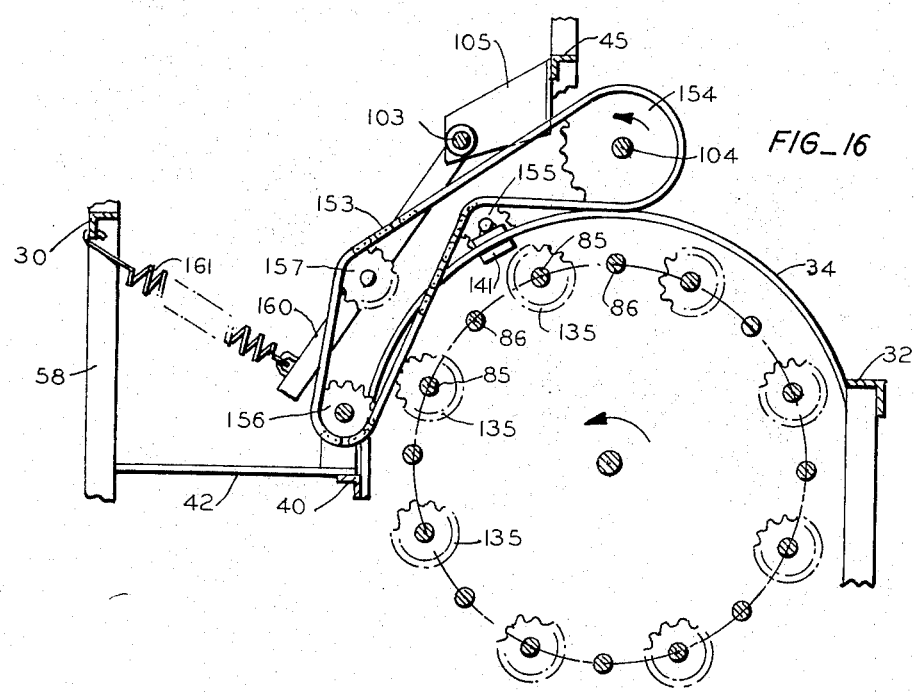
FIG_16
INVENTOR.
JOSEPH A. AMORI
BY
Naylor + Neal
ATTORNEYS United States Patent Office 3,372,722
Patented Mar. 12, 1968

3,372,722
APPARATUS FOR DRUPE HALVING AND PITTING
Joseph A. Amori, 1596 Davis St., San Jose, Calif. 95100
Original application May 25, 1964, Ser. No. 369,707. Divided and this application Dec. 12, 1966, Ser. No. 607,349
16 Claims. (Cl. 146—28)

ABSTRACT OF THE DISCLOSURE

Apparatus for halving and pitting drupes characterized by a pair of annular members having parallel axes of rotation, one of said members being in the form of a disc having a peripheral edge adapted to impale the meat of a drupe and grippingly engage the pit thereof, the other of said members having a wedge-shaped channel into which the disc-like member extends, the upper peripheral portions of said members defining therebetween a drupe receiving and supporting pocket, and means for rotating said pair of members to rotate the meat of a received and supported drupe relative to the pit thereof.

---

This application is a divisional application based upon my copending application, Ser. No. 369,707, filed May 25, 1964, now abandoned.

This invention relates to a drupe halving and pitting machine and more particularly is directed to such a machine which is adapted to halve and pit freestone peaches. In its more specific aspects, the invention is concerned with an improved drupe halving and pitting machine of the type disclosed in United States Patent 2,823,717 which is convertible for use with either freestone peaches or apricots.

Drupe halving and pitting machines adapted for use with apricots are known in the prior art and have proved successful. These machines are quite versatile and have been provided both for automatic and hand feeding. The successful operation of these machines is, however, dependent largely upon the inherent physical characteristics of apricots and, accordingly, the machines have proved well suited only for the handling of apricots. The particular characteristics of apricots referred to are the resistance of the meat to damage by abrasion and impact, and the relatively easy separation of the pit from the meat upon halving of the meat.

Thus far, in attempts to develop successful halving and pitting machines for freestone peaches, no such machines have met with the same degree of success as those in the apricot halving and pitting art. The most apparent reason that such peach pitting and halving machines have not proved as successful as those for apricots resides in the inherent physical characteristics of such peaches. Specifically, as compared to the physical characteristics of apriots, the meat of a freestone peach clings to the pit thereof with considerable tenacity. Furthermore, the meat of such peaches is much more readily susceptible to injury by impact or abrasion than is that of apricots.

It is, accordingly, a principal object of the present invention to provide an improved method and apparatus for halving and pitting drupes, and particularly freestone peaches, in a manner to avoid damage to the meat of the drupe and minimize the loss of drupe meat due to adherence of the same to the pit.

Another object of the invention is to provide an apparatus to maintain drupes in orientated position for halving and pitting.

A more specific object of the invention is to provide a drupe halving and pitting apparatus wherein, during cutting, the drupe pit is held between a cutting element and an impaling element simultaneously with the spinning of the drupe meat relative to said pit.

Another object of the invention is to provide a drupe orientation maintaining mechanism adapted to spin the meat of a drupe relative to the pit thereof.

Still another object of the invention is to provide a drupe turning and orientation maintaining device with improved means to frictionally engage the flesh of drupes handled thereby.

Yet another object of the invention is to provide a drupe turning and orientation maintaining device adapted to handle drupes of varying diameters and degrees of ripeness.

In its broadest aspect, the present invention may be said to reside in a method and apparatus to accomplish the aforementioned objects. The inventive apparatus is directed primarily to a drupe turning and orientation maintaining device which is adapted to cooperate with a cutting element to produce both halving and pitting functions. The drupe turning and orientation maintaining device comprises a pair of opposed rotating annular members adapted to turn about parallel axes and defining therebetween a drupe receiving pocket. At least one of the annular members is provided with a roughened surface adapted to engage a drupe received within said pocket and impart rotation thereto. The roughened surface enhances the gripping characteristics of the annular member and thus, as will become subsequently apparent, facilitates the operation of the entire apparatus. In certain situations the roughened annular member is also fluted to provide for the escape of drupe material, such as peach fuzz, laterally therefrom and further enhance the drupe gripping characteristics thereof. The roughened surfaces of the annular members together with the flutes formed in these surfaces provides for a non-slip drive connection between these members and the drupes as these members are rapidly spun during the fruit halving and pitting operation. In fact, peeled drupes may be handled for such halving and pitting with essentially no slippage taking place between the peeled drupes and the annular members when the latter are rapidly spun from a stationary to relatively high speed condition.

The foregoing and other objects and the detailed structure of the invention will become apparent when viewed in light of the accompanying drawings, wherein:

FIG. 1 is a plan view of the inventive apparatus in condition to halve and pit freestone peaches;

FIGS. 2, 3, 4 and 5 are sectional views taken on lines 2—2, 3—3, 4—4 and 5—5 respectively of FIG. 1;

FIG. 6 is an enlarged plan view, partially in section, illustrating the drupe engaging annular members of the invention adapted to be used with freestone peaches;

FIG. 7 is a sectional view taken on line 7—7 of FIG. 4;

FIG. 8 is an enlarged sectional view of one of the drupe engaging annular members illustrated in FIG. 6, illustrating the manner in which the member frictionally engages peaches of varying diameters;

FIG. 9 is a vertical elevational view, partially in section, illustrating one of the main annular cutting knives of the inventive apparatus and part of the support and drive structure therefor;

FIGS. 10 and 11 are sectional views taken on lines 10—10 and 11—11, respectively, of FIG. 3;

FIG. 12 is a sectional view taken on line 12—12 of FIG. 5;

FIG. 13 is an enlarged side view of one of the annular peach cutting and pit engaging discs illustrated in operative condition in FIG. 2;

FIG. 14 is a side elevational view corresponding to FIG. 2, but illustrating the apparatus in condition to handle apricots;

FIG. 15 is an enlarged view corresponding to FIG. 6, but illustrating annular members adapted to facilitate the handling of apricots rather than freestone peaches; and, FIG. 16 is a sectional view corresponding to FIG. 4, but illustrating apparatus in condition to handle apricots.

The basic apparatus of the invention, for simplicity of description, may be divided into several sub-assemblies, comprising: a main drupe cutting mechanism; a conveying mechanism for directing drupes to the cutting mechanism; and a drupe gripping, turning and orientation maintaining mechanism.

At this point it is noted that the structure of the present invention illustrated in the drawings comprises two basically identical halves, each adapted to simultaneously handle drupes in a like manner. The main drupe cutting mechanism and the gripping, turning, and orientation maintaining mechanism are, therefore, duplicated at least in part on opposite sides of the machine, as viewed at the top and bottom of FIG. 1. Accordingly, in the subsequent description, corresponding parts of the identical structure will be designated by like numerals. For the sake of simplicity, the detailed description of such corresponding parts will be directed primarily to only one of the parts. Where the identical halves cooperate with a common structure, such as certain parts of the conveying mechanism, this cooperation will be apparent.

Referring now to FIG. 1, the numerals 20, 21, and 22 therein designate generally the main cutting mechanism, the conveying mechanism, and the drupe turning and orientation maintaining mechanism, respectively. These mechanisms are supported by a common frame which includes, as viewed in FIG. 1, longitudinally extending horizontal members 23 to 27 and transversely extending horizontal members 29 to 32. Arcuate frame members 33 to 37 extend longitudinally between the transverse member 32 and a transverse member 40 disposed inwardly of the frame, as can be seen in FIG. 3. FIGS. 2 to 5, 10 and 11 illustrate further frame members including: longitudinal members 41, 42 and 43; transverse members 45 and 46; and vertically extending post members 47 to 50, 58 and 59. As is apparent from the drawings, the aforementioned frame members are interconnected so as to comprise a rigid unit. Certain of the frame members, such as the corner posts, have been omitted for the sake of clarity.

*The main drupe cutting mechanism*

The main cutting mechanism of the apparatus comprises a pair of identical cutting structures driven by a single electric motor 51. For the sake of clarity, corresponding components of the two cutting structures are designated by like numerals. The motor 51 is fixedly mounted on the frame member 41 and has a drive belt 52 extending from the drive sheave 54. The sheave 54 is fixed to and supported for rotation with a main drive transmission shaft 55 which is rotatably mounted onto and between frame members 24 and 26 by trunnions 56 and 57, respectively.

Large annular cutting knives 60 are supported about the shaft 55 by adjustable hangers 61 journaled at one end to the shaft 55 and at the other end to knife driving shafts 62. The knives 60 are concentrically mounted on the drive shafts 62 for rotation in a vertical plane. Rotation is imparted to the shafts 62 through means of intermediate drive transmission sheaves 63 on the shaft 55, drive sheaves 64 on the shafts 62 and belts 65 drivingly extending between said drive transmission sheaves and drive sheaves.

The detailed structure of each knife 60 includes an annular blade 66 having a scalloped periphery (see FIG. 2) defining a rounded cutting edge. From the subsequent description, it will become apparent that the scalloped periphery of the blade 66 imparts impact to the drupes being cut thereby and that the rounded cutting edge facilitates velocity cutting of the drupe meat without fragmentation or cutting of the drupe pits. The blade 66 is fixedly and concentrically mounted on the shaft 62 for rotation therewith by oppositely disposed mounting plates 67 and 68 having hub sections 71 (see FIG. 9). The blade 66 is fixed to and clampingly held between the plates 67 and 68 by bolts 72 which pass through said blade and plates. The plates 67 and 68 are, in turn, fixed to the shaft 62.

As thus far described, it can be seen that each knife 60 is supported for both rotational movement about the axis thereof and for swinging movement about the axis of the shaft 55. Control of such swinging movement is accomplished by the weight of the knife and of its supporting element, or hanger 61, trunnioned to the shaft 55 and by spring means and through counterbalance and positionally adjustable means cooperating with the hanger 61. The spring means, as illustrated in FIG. 2, comprises a high tension coil spring 69 secured at its opposite ends to the hanger 61 and the frame. The high tension coil spring 69 prevents any swinging movement of the knives 60 about the shafts 55 during the halving and pitting of freestone peaches. Thus, for such peaches knives 60 are rapidly rotated but are otherwise stationary in space.

The counterbalance mechanism corresponds substantially to that of aforementioned United States Patent 2,823,717 and comprises an elongated lever arm 73 which is pivotally attached by a bolt 74 to ears 75 secured to the frame. Ears 75 are vertically and adjustably positionable on frame members 47 so that the cutting edges of the knives 60 may be positionally pre-set at the desired distance away from the adjacent drupe-supporting and drupe-spinning means. The lever arm 73 is connected by a link 76 to an arm member 77 secured to the hanger 61, and the lever arm 73 is provided with a slidably adjustable weight 80 which may be selectively positioned thereon by a clamping bolt 81. The weighted lever arm 73 tends to swing in a counterclockwise direction, as viewed in FIG. 2, under the action of gravity and thereby tends to swing the knife assembly in a clockwise direction through the link connection 76–77. It can thus be seen that the weight of the knife assembly may be counterbalanced in whole or in part to adjust the pressure with which the blade 66 contacts a drupe to be cut. As previously indicated, the described counterbalance mechanism is not operable during the cutting and pitting of freestone peaches due to the overriding strength of spring 69 which functions to immobilize the knife in space except for its rotational movement.

*The drupe conveying mechanism*

Included as an essential element of the drupe conveying mechanism is a main support shaft 82 extending between the frame members 23 and 27 and journaled thereto by trunnions 83. Parallel circular plates 84 are concentrically mounted in fixed and normal relationship to the shaft 82 adjacent the ends thereof journaled in the trunnions 83. The plates 84 have alternate rods 85 and 86 extending therebetween and journaled adjacent the edges thereof so as to define an imaginary cylinder. The axis of the imaginary cylinder so defined coincides with that of the shaft 82 and, thus, the shaft 82 mounts the imaginary cylinder for rotational movement about its axis.

Rotational movement is imparted to the imaginary cylinder through means of a motor 87 mounted on the frame member 41 and a drive transmission means extending between said motor and the cylinder. The drive transmission means includes a speed reduction box 90 mounted on the frame member 25 above the motor 87 and sheaves 91 and 92 on said motor and gear box, respectively, drivingly connected by a belt 93 extending therebetween (see FIG. 3). The speed reduction box 90 has extending from the side thereof opposite the sheave 92 a driven shaft 94, which shaft has received thereon a sprocket 95. Rotational movement of the sprocket 95 is transmitted to the imaginary cylinder by a chain 96 trained over said sprocket and the periphery of said cylinder (see FIG. 5). From FIG. 12, it can be seen that the spacing of the links of the chain 96 and the rods 85 and 86 is such that driving engagement between the chain and the cylinder defined by said rods is assured. Specifically, the outwardly facing surfaces of the rods 85 and 86 are spaced so as to engage the recessed edges of the links in the chain 96 trained therearound.

From FIG. 5, it can be seen that the chain 96 is trained over idler sprockets 97 and 98 and a driven sprocket 101, all of which cooperate to direct the chain into engagement with the imaginary cylinder. The idler sprocket 97 is pivotally mounted on a spring biased arm 102 which continuously urges it into engagement with the chain 96 to take up the slack therein. The sprockets 98 and 101 are carried on shafts 103 and 104, respectively. As can be seen from FIG. 3, the shafts 103 and 104 are supported on brackets 107 and 110, respectively. The bracket 107 is secured to the frame member 45 and the bracket 110 is secured to the bracket 107 and the frame member 36. The bracket 107 extends from the member 45 in cantilever-like fashion, whereas the bracket 110 extends between the member bracket 107 and the member 36. The ends of the shafts 103 and 104 remote from the brackets 107 and 110 are supported on corresponding brackets 105 and 106, respectively (see FIG. 1). It is noted that the sprocket 101 is fixed to the shaft 104 for rotation therewith and that the shaft 104 is rotatably mounted on the brackets 106 and 110 by trunnions 111. The further function of the shaft 104 will become apparent subsequently. Since the sprocket 98 is merely an idler, it is rotatably mounted on the shaft 103. This arrangement is preferred because other elements, as will be developed subsequently, are mounted on the shaft 103 for pivotal movement therearound.

*Gripping, turning and orientation maintaining mechanism*

The captioned mechanism cooperates closely with the aforedescribed conveying mechanism in that the drupe handling elements thereof are carried by the rods 85 and 86. In this mechanism, the handling elements are particularly suited for use with freestone peaches or other drupes having similar physical characteristics. These elements comprise discs 112 mounted on the ends of the rods 85 and annular roller members 113 mounted on the ends of the rods 86 in opposition to the discs 112 so as to define a three point suspension or contact drupe receiving pocket therebetween. Both the discs 112 and roller members 113 are fixed, as by keyways, not shown, to the shafts upon which they are mounted so as to be rotatable therewith. At this point it is noted that the rods 85 and 86 are rotatably supported in the circular plates 84 by bushings 114 (see FIGS. 1 and 6).

Referring now to FIG. 6, therein is illustrated the detailed interrelationship of the discs 112 and roller members 113. The roller members 113 are shown therein as comprising a pair of opposed identical annular segments 115 having concentric circular openings 116 extending therethrough and adapted to be snugly received on the rods 86. As received on the rods 86, the segments 115 are separated by a spacer ring 117 and are held lockingly in place by nuts 120 threaded onto the rods 86 and against the outwardly facing sides of the segments. The radially outwardly facing annular surfaces 121 of the segments 115 define an annular wedge-shaped channel around the members 113. It is into this channel, and particularly the central slotted section thereof defined between the spaced segments 115, that the disc 112 extends when assembled onto the shaft 85. The disc 112 is assembled onto the shaft 85 through means of a circular opening 122 extending concentrically therethrough and snugly received on the rod 85. The disc is held in the position illustrated in FIG. 6 by cylindrical spacers 123 extending around the rod on opposite sides of the disc and lock nuts 124 threaded onto the rod 85 and into engagement with the ends of the spacers. It is believed apparent that the nuts 120 and 124 provide means whereby the discs 112 and roller members 113 may be readily adjusted into opposed and aligned relationship.

From the relationship of the discs 112 and roller members 113 in the assembled condition, it can be seen that these elements define a three point suspension or contact drupe receiving pocket therebetween. Specifically, the pocket is defined by the surfaces 121 of the segments 115 and the periphery of the disc 112. For purposes of illustration, a peach 125 having a pit 126 is shown received in one of these pockets in FIG. 2. Although this illustration shows the periphery of the disc 112 impaling the meat of the peach, from the subsequent discussion it will be seen that the peach may initially be placed in the pocket in a condition wherein its outer surface merely contacts the surfaces 121 of the segments 115 and the outer periphery of the disc 112.

At this point, it is noted that the surfaces 121 are specifically designed so that rotational movement imparted to the roller members 113 through the shafts 86 will be transmitted to drupes received within the aforementioned pockets. From FIGS. 6 and 8 it can be seen that the surfaces 121 have extended transversely thereof flutes or grooves 127. These grooves facilitate both the gripping of drupes and the discharge of drupe material, such as peach fuzz, laterally from the surfaces 121. Gripping action of the surfaces 121 is further enhanced by a roughened finish thereon which may be produced by any suitable means, such as knurling, sand blasting or the adhesion of abrasive particles thereto.

The gripping of drupes of various diameters, the maximum and minimum extremities of which are exemplified by the phantom lines 130 and 131, respectively, In FIG. 8, is also facilitated by the surfaces 121. This gripping facility is accomplished by forming the surfaces 121 so that they correspondingly diverge from the center of a channel defined therebetween in the assembled condition at progressively decreasing angles with respect to a plane passing through said center and normal to the axis of the members 115. In the illustration of FIG. 8, this diverging is accomplished by forming the surface 121 in segments 121a and 121b.

FIG. 13 illustrates the disc 112 in detail and particularly shows the formation of teeth 132 thereon. The teeth 132 are formed around the disc 112 so as to define the periphery thereof. Each of the teeth 132 is separated from the tooth adjacent thereto by a notch-like section 133 of substantialy V-shaped configuration. Thus, the extremity of each tooth 132 presents a sharp point when viewed from the side, as in FIG. 13. The sides of the disc 112 adjacent to the teeth 132 are formed with a hollow ground bevel 134 converging from a point below the notch sections 133 to a sharp edge at the tips of the teeth 132. Thus, each of the teeth 132 presents a sharp point when viewed both from the side, as illustrated in FIG. 13, and from the top as shown in FIG. 6. From the subsequent discussion it will be seen that the points of the teeth 132 are particularly adapted for both the impaling of the meat of a freestone peach and the gripping of the pit thereof.

In operation, the rods 85 and 86 and the discs and roller members, respectively, carried thereon are rotated about their axes when the aforementioned pockets defined between said discs and roller members are in the path of the blade 66. The pockets between the discs and roller members are successively brought into the path of the knife 66, as illustrated in FIG. 2, as the imaginary cylinder defined by the rods 85 and 86 is turned. As viewed in FIG. 2, it can be seen that the blade 66 is turned in a clockwise direction while the imaginary cylinder is being turned in a counterclockwise direction. Thus, the upper pockets defined between the discs 112 and roller members 113 are continuously moved towards the blades 66 in the same direction that the blade is moving. At the time the pockets are in the path of the knives 66, the shafts 85 and 86 are energized to turn the discs 112 and roller members 113, respectively, in a clockwise direction. Thus, the discs 112 function to direct peaches engaged thereon towards the roller member to the right thereof, as viewed in FIG. 2, while at the same time the roller member functions to turn the meat of the peach in a counterclockwise direction.

Reference is now made to FIG. 4 wherein an arrangement to impart rotational movement to the rods 85 and the discs 112 fixed thereto is illustrated. This arrangement includes drive sprockets 135 fixed to each of the rods 85 intermediate the ends thereof and a drag chain 136 positioned so as to engage the sprockets 135 as the pockets between the discs 112 and annular roller members 113 are brought into the path of the knife 60. The chain 136 is held in position by a coil spring 137, secured to one end thereof and extending into engagement with a transverse frame member 140, and a clamp 141, secured to the other end thereof and engaging the frame members 34 and 35. From FIG. 7 it can be seen that the clamp 141 comprises a pair of plates clampingly held against the frame members 34 and 35 by a bolt 142. The purpose of the adjustable clamp member 141 is to provide for adjustment of the exact time the chain 136 engages the sprockets 135. Thus, it can be seen that rotation imparted to the imaginary cylinder defined by the rods 85 and 86 also functions to rotate the rods 85 and the discs secured thereto at a preselected time.

The preferred arrangement for rotatably driving discs 112 is a driven chain rather than a drag chain, i.e., chain 153 of FIG. 16 and support and drive system therefor as ilustrated in FIG. 16 and hereinafter described.

FIG. 3 illustrates the drive arrangement for the shafts 86 and the roller members 113 secured thereto. This arrangement comprises sprockets 143 fixed to each of the rods 86 intermediate the ends thereof and a driven chain 144 trained over these sprockets. The chain 144 is driven by a sprocket 145 fixed to the aforedescribed shaft 104 and is directed into engagement with the sprockets 143 by idler sprockets 146 and 147. The idler sprocket 147 is carried on an arm 150 which is pivotally mounted on the shaft 103 and resiliently urged in a clockwise direction by a spring 151. Adjustment of the time at which the chain 144 drivingly engages the sprockets 143 is facilitated by the movable mounting of the trunnions 111 on the brackets 106 and 110 (see FIG. 10).

The operation of the gripping, turning and orientation maintaining mechanism, in combination with the drupe cutting mechanism and drupe conveying mechanism, will now be described with particular reference to FIG. 2. It is noted that the apparatus shown in FIG. 2 is in condition for the handling of freestone peaches or other drupes having like characteristics. In operation, once the electric motors 51 and 87 have been energized to turn the various elements in the directions indicated by the arrows in FIG. 2, drupes are hand fed to the pockets defined between the discs 112 and the roller members 113, Ideally, the drupes are placed in the pockets in an orientation with their suture lines vertically disposed in alignment with the periphery of the discs 112 so that cutting of the drupe will take place along the suture line, as will become apparent subsequently. To assure that this orientation is not disturbed, discs 112 and roller members 113 are not energized for rotation about their axes until the drupe received in a pocket therebetween is engaged by the blade 66. The drupes are placed in the pockets when the pockets are disposed substantially above the shaft 82 defining the axis of the imaginary cylinder on which the pockets are carried.

Upon being placed in the pockets between the discs 112 and the roller members 113, rotation of the imaginary cylinder functions to direct the drupes into the path of the blade 66. At the same time, the rods carrying the disc and roller member defining the pocket in which a drupe is received are directed into engagement with the drive chains therefor. Thus, when the drupe reaches the position illustrated in FIG. 2, the meat thereof is simultaneously cut by the blade 66, impaled on the disc 112, and spun by the surfaces 121 of the roller member 113. When the meat of the drupe is impaled on the disc 112, the drupe pit 126 is gripped by the teeth 132 of the disc and is engaged between said teeth and the outer periphery of the blade 66. It is noted that the pits of freestone peaches have pocked surfaces and that they are, therefore, readily gripped by the teeth 132. Upon being engaged between the blade 66 and the disc 112, the pit 126 is also subjected to impact by the blade. This impact results from the turning of the scalloped edge of the blade against and with respect to the pit.

With the pit 126 engaged between the blade 66 and the teeth 132, the peach halving and pitting function of the apparatus becomes complete. Specifically, the pit is at this point turned relatively slowly by the disc while at the same time the meat of the peach is spun by high velocity relative to the velocity of turning of the pit by the roller member 113. The difference in the relative driving velocities imparted by the disc 112 and the roller member 113 results from the fact that the disc, being smaller, is relatively slowly driven by the driven chain 153, while the roller member, being larger, is relatively rapidly driven by the driven chain 144. Spinning of the meat of the peach relative to the pit functions to break the meat away from the pit and also to turn the meat relative to the blade 66, thus cutting the meat through to the pit around the entire suture line of the peach. As a result, the peach meat is halved and falls to opposite sides of the disc 112. At the same time, the pit 126 is squeezed between the edge of the blade 66 and the periphery of the disc 112 to such an extent that it is ejected upwardly and to the right of the position illustrated in FIG. 2. The latter ejection results from the fact that the dimension between the edge of the blade 66 and the periphery of the disc 112 remains substantially constant and is less than that of the pit diameter.

It has been found that when the aforedescribed apparatus is hand fed, a feed rate of about 60 peaches per minute for each side of the apparatus is preferable. At this rate, the pockets between the discs and roller members approach the blade 66 at approximately 440 inches per minute. Suitable speeds for the discs 112 and the roller members 113 for use with this feed rate have been found to be approximately 500 inches per minute and 3,400 inches per minute, respectively. At the latter speeds, rotation of the blade 66 so that the peripheral edge thereof turns at about 36,000 inches per minute assures adequate cutting. It is noted that the high blade speed is necessary to provide for velocity cutting of the peach meat with the relatively rounded edge of the blade. The rounded edge of the blade 66 assures that the pits of freestone peaches, which are relatively brittle, will not be fragmented or shattered by the blade edge.

From the foregoing description the operation of the inventive apparatus in the halving and pitting of freestone peaches and the like is believed apparent. It is noted that the surfaces 121 of the roller members 113 provide both for the gentle handling of the meat of peaches and for the spinning of this meat at relatively high velocities. Continuous cleaning of the surfaces of the roller members 113 and the teeth of the discs 112 is facilitated by a pressure spray 152, as illustrated in FIG. 2. The spray 152 communicates with a source of fluid under pressure, such as a conventional city water line, and is directed to the interior of the discs 112 and roller members 113.

*Conversion assembly for handling apricots*

In some instances it may be found preferable to modify the aforedescribed apparatus when it is to be used with drupes having physical characteristics differing considerably from those of freestone peaches. The subject conversion assembly is directed to a modification resulting in an embodiment of the invention particularly suited for the handling of apricots. Apricots, for handling purposes, differ from freestone peaches mainly in that the meat thereof is more resistant to injury, the pits thereof are smoother and less brittle and adhere to the meat with less tenacity, and the typical diameters of the fruit are less. From the following detailed description it will be seen that the modified embodiment converted for use with apricots differs from the aforedescribed embodiment for freestone peaches only in the mounting of the main cutting knife and the details of the gripping, turning and orientation maintaining mechanism.

FIGS. 14, 15 and 16 illustrate the parts of the aforedescribed apparatus modified for use in handling apricots. It is to be understood that the parts not illustrated or described as being changed correspond to those previously described with reference to the apparatus adapted for the handling of freestone peaches. Therefore, many of the elements illustrated in FIGS. 14, 15 and 16 correspond to those previously described and, accordingly, are designated by like numerals.

The mounting of the knife 60 in FIG. 14 differs from that previously described with respect to FIG. 2 in the following particulars: the knife is reversed on the shaft 62; the hanger is not anchored in a fixed position by spring 69; and instead of being fixedly mounted with respect to shaft 62 knife 60 is pendulum-mounted with respect to this shaft in the manner illustrated in FIG. 4 of United States Letters Patent 2,707,126. Reversing of the knife on the shaft 62 results in a reversing of the scalloped portions on the blade 66. This has the effect of increasing the impact that the blade 66 will impart to the pits of drupes being cut. Specifically, as arranged in FIG. 14, the upwardly stepped sections of the scalloped blade 66 will impact directly against the pit of a drupe being cut. The omission of spring biasing from the knife hanger permits the knife to swing as a pendulum about the shaft 55 and, as a result, increases the impact imparted to drupe pits thereby.

The drive mechanism for rotating the rods 86 about their axes in the subject apricot assembly corresponds identically to that described previously with respect to FIG. 3 except that the drive sprocket 145 is made slightly smaller. This difference results in a slight slowing down of the chain 144 for reasons which will become apparent from the subsequent discussion.

The drive assembly for rotating the rods 85 about their axes comprises a driven chain 153. This drive assembly is also the preferred drive assembly for rotating the rods 85 about their axes in the previously described freestone peach machine. The driven chain 153 is driven by a sprocket 154 carried by the shaft 104. Sprocket 154 has a diameter corresponding to that used to drive the rods 86 in the apricot assembly so that in the apricot assembly both sets of rods 85 and 86 are rotated at the same r.p.m. The chain 153 is directed into engagement with the sprockets 135 by stationary idler sprockets 155 and 156 and a spring biased idler sprocket 157. The stationary sprocket 155 is adjustably held to the frame members 34 and 35 by the aforedescribed clamp 141 so that the point at which the chain 153 engages the sprockets 135 may be adjusted. The spring biased sprocket 157 is mounted on an arm 160 pivotally secured to the shaft 103 and resiliently biased in a clockwise direction (as viewed in FIG. 16) by a spring 161.

The drupe gripping and orientating maintaining elements of the apricot assembly are illustrated in detail in FIG. 15 and differ from those described previously with respect to FIG. 6 in that V-rollers 162 and annular rollers 163 have been substituted for the discs 112 and roller members 113, respectively. Each V-roller 162 comprises a pair of truncated conical segments 164 fixed to a rod 85 in opposed relationship by nuts 165 and a keyway, not shown. Each annular roller 163 comprises a pair of opposed annular segments fixed to a rod 86 in opposed relationship between spacer sleeves 167 and nuts 170 by a keyway, not shown. As can be seen from both FIGS. 14 and 15, the rollers 162 and 163 are assembled in opposed relationship so as to define a three point suspension or contact drupe receiving pocket therebetween. This pocket, as will be developed subsequently, is adapted to carry drupes into the path of the knife 60. The opposed annular surfaces of the rollers 162 and 163 which define these pockets are roughened so as to enhance their drupe gripping characteristics. These surfaces may be roughened by any suitable means, such as knurling, sand blasting, or coating with an adhesive having abrasive particles therein.

In operation of the apricot handling assembly, as illustrated in FIG. 14, the electric motors 51 and 87 are first energized to simultaneously rotate the knife 60, the imaginary cylinder defined by the rods 85 and 86, and the rollers 162 and 163 defining pockets in the path of the blade 66. Apricots are then placed in the upwardly facing pockets disposed between the V-rollers 162 and the annular rollers 163 to the right thereof, as viewed in FIG. 14. The apricots are placed between these specific rollers because the V-rollers have a smaller diameter than the annular rollers at their point of apricot contact, and, accordingly, a lesser peripheral speed which serves to force the apricots towards the annular rollers to a limited extent. It is noted that the lesser peripheral speed of the V-rollers 162 relative to the annular rollers 163 at their points of apricot contact assures that rotation of the V-rollers will not tend to pinch and force apricots through the space between said V-rollers and annular rollers. The apricots are placed in the pockets with the suture lines thereof oriented in the same vertical plane as the blade 66. To assure that this orientation is not disturbed, the V-rollers 162 and annular rollers 163 are not energized for rotation about their axes until the apricot received in the pocket therebetween is engaged by the blade 66.

After being placed in an upwardly facing pocket between the rollers 162 and 163, an apricot, as exemplified at 171 in FIG. 14, is directed into the path of the blade 66. At the time the apricot enters the path of the blade, the rollers 162 and 163 are turned in a clockwise direction, as indicated by the arrows, and the apricot is spun with respect to the blade 66. As a result, the meat of the apricot is cut through around its entire suture line and at the same time the pit of the apricot is hammered by the scalloped edge of the blade 66. This simultaneous action functions to both halve the meat of the apricot and break the pit loose therefrom. After being so separated, both the pit and the halves of the meat fall to the left, as viewed in FIG. 14, of the imaginary cylinder defined by the rods 85 and 86.

It is to be understood that the apricot assembly of the invention corresponds to the aforedescribed freestone peach assembly in that the machine comprises two halves which may be continuously and simultaneously fed. Furthermore, in the apricot assembly the knife 60 and the imaginary cylinder defined by the rods 85 and 86 move at the same velocity that they did in the freestone peach assembly. At this speed a suitable speed for the annular surfaces of the rollers 162 and 163 has been found to be about 2,100 inches per minute. It is noted that the V-rollers 162 and annular rollers 163 are only rotated when the drupe receiving pockets defined therebetween are in the path of the blade 66. The exact time of commencement of this rotation may be adjusted to obtain optimum results by adjusting the drive chains for the rods 85 and 86 as was described previously.

To conclude, from the foregoing detailed description it is believed apparent that the present invention enables the accomplishment of the objects initially set forth herein. In particular, provision has been made for the effective and rapid halving and pitting of freestone peaches and apricots. This provision is facilitated in a large part by an improved arrangement for gripping the meats of any drupes, and particularly freestone peaches, without the injury thereof. It is to be understood, however, that the invention is not intended to be limited to the specific embodiments illustrated and described but rather is defined by the following claims.

What is claimed is:

1. In a drupe halving and pitting machine, comprising:
   (A) a support frame;
   (B) an annular knife carried by said support frame for rotational slicing movement in a vertical plane, the outer periphery of said knife defining the cutting edge thereof; and,
   (C) means to impart rotational slicing movement to said knife;
   an improved mechanism cooperating with said knife to direct drupes thereto for halving and pit removal, said mechanism comprising:
   (A) at least one pair of rotatable shafts movably supported in fixed parallel relationship to each other adjacent to said knife;
   (B) a disc concentrically mounted on one shaft for rotation therewith, said disc having a periphery defined by radially extending knife-like teeth;
   (C) an oppositely disposed annular member mounted on the other shaft for rotation therewith, said member having therearound a wedge-shaped channel into which the periphery of said disc extends, the opposed surfaces of said channel in conjunction with said periphery defining a cradle type pocket adapted to receive a drupe therein;
   (D) means to move said parallel shafts to a position wherein said pocket is located so that the cutting edge of the rotating knife will cut through the meat of a drupe received therein and engage the pit of said drupe to force said pit into engagement with the teeth of said disc, the distance between the respective peripheries of said knife and disc in said position being insufficient to permit the pit to pass therebetween; and,
   (E) means to rotate said disc and said annular member in a direction opposite that of the knife, when in said position, at relative speeds whereby the surface of said member engaging the drupe surface spins the meat thereof with respect to the pit.

2. A mechanism according to claim 1 wherein the opposed surfaces of said channel and roughened to enhance the drupe gripping characteristics thereof.

3. A mechanism according to claim 1 wherein the opposed surfaces of said channel are fluted to provide for the escape of drupe material laterally therefrom and to enhance the drupe gripping characteristics of said surfaces.

4. A mechanism according to claim 1 wherein the cutting edge of said annular knife is scalloped to impact a pit upon turning when in engagement therewith.

5. A mechanism according to claim 2 wherein the opposed surfaces of said channel are fluted to provide for the escape of drupe material laterally therefrom and to enhance the drupe gripping characteristics of said surfaces.

6. In a drupe halving and pitting machine, comprising:
   (A) a support frame;
   (B) an annular knife carried by said support frame for rotational slicing movement in a vertical plane, the outer periphery of said knife defining the cutting edge thereof; and
   (C) means to impart rotational slicing movement to said knife;
   an improved mechanism cooperating with said said knife to direct drupes thereto for halving and pit removal, said mechanism comprising:
   (A) a horizontally disposed first shaft mounted for rotation on said frame;
   (B) spaced parallel plates secured to said shaft;
   (C) a plurality of parallel shafts supported for rotation by said plates, the axes of said shafts defining the surface of an imaginary cylinder with the axis of said cylinder being the axis of said first shaft;
   (D) discs concentrically mounted on alternates of said parallel shafts for rotation therewith, said discs having peripheries defined by radially extending knife-like teeth;
   (E) annular members mounted on alternates of said parallel shafts between the shafts on which said discs are mounted and in opposition to said discs, each of said members having therearound a wedge-shaped channel into which the peripheries of said discs opposed thereto extend, the opposed surfaces of said channels in conjunction with said peripheries defining cradle-type pockets adapted to receive drupes therein;
   (F) means to rotate the imaginary cylinder defined by said parallel shafts to successively move said pockets to a position wherein the cutting edge of the rotating knife will cut through the meat of drupes received therein and engage the pits of said drupes to force said pits into engagement with the teeth of said discs, the distance between the respective peripheries of said knife and discs in said position being insufficient to permit a pit to pass therebetween;
   (G) means to rotate said discs in a direction opposite to that of the knife rotation, when in said position; and,
   (H) means to rotate said annular members in a direction opposite to that of the knife rotation, when in said position, at a speed relative to the speed of rotation of said discs whereby the surface of said members engaging the drupe surfaces spins the meat thereof with respect to the pit thereof.

7. A mechanism according to claim 6 wherein said means to rotate said discs comprises:
   (A) sprockets fixed to the parallel shafts on which said discs are mounted; and,
   (B) a driven chain adapted to engage said sprockets.

8. A mechanism according to claim 6 wherein the cutting edge of said annular knife is scalloped to impact a pit upon turning when in engagement therewith.

9. A mechanism for maintaining drupes in oriented position while turning the meat thereof at a relatively high velocity with respect to the pit thereof, said mechanism comprising:
   (A) a pair of parallel rotatable shafts supported in close proximity to each other;
   (B) a disc mounted on one shaft for rotation therewith, said disc having a periphery defined by upwardly and downwardly disposed radially extending knife-like teeth adapted to impale the meat of a drupe and grip the pit thereof;
   (C) an oppositely disposed annular member mounted on the other shaft for rotation therewith, said member having therearound a wedge-shaped channel into which the periphery of said disc extends, the opposed surfaces of said channel being adapted to grip the meat of a drupe impaled on the teeth of said disc;
   (D) means to rotate said disc in a direction to continuously move the upwardly disposed teeth thereof toward said annular member; and,
   (E) means to rotate said annular member in the same direction as said disc at a speed relative to the speed of rotation of said disc sufficient to spin the meat of a drupe impaled on the teeth of said disc with respect to the pit of said drupe.

10. A mechanism according to claim 9 wherein the opposed surfaces of said channel correspondingly diverge at progressively decreasing angles with respect to a plane passing through the center of said channel and normal to the axis of said annular member.

11. A mechanism according to claim 9 wherein the opposed surfaces of said channel are roughened to enhance the drupe gripping characteristics thereof.

12. A mechanism according to claim 9 wherein the opposed surfaces of said channel are fluted to provide for the escape of drupe material laterally therefrom and to enhance the drupe gripping characteristics of said surfaces.

13. A mechanism according to claim 11 wherein the opposed surfaces of said channel are fluted to provide for the escape of drupe material laterally therefrom and to enhance the drupe gripping characteristics of said surfaces.

14. A drupe turning and orientation maintaining mechanism comprising:
 (A) a pair of parallel rotatable shafts;
 (B) a pair of annular members mounted concentrically on said respective shafts for rotation therewith, said members being oppositely disposed so as to define a drupe receiving and supporting pocket therebetween, one of said members being in the form of a relatively thin disc having a peripheral edge adapted to impale the meat of a drupe within said pocket and grippingly engage the pit thereof, the other of said members having a wedge-shaped channel into which said one member extends, said channel having a surface adapted to frictionally engage a drupe within said pocket; and
 (C) means to impart rotation to said members.

15. A mechanism according to claim 14 wherein flutes in the surface of said channel interrupt said surface and provide for the escape of drupe material laterally from the other of said members.

16. A mechanism according to claim 14 wherein the surface of said channel is formed of opposed walls which correspondingly diverge at progressively decreasing angles with respect to a plane passing through the center of said channel and normal to the axis of the other of said members.

References Cited

UNITED STATES PATENTS

| | | | |
|---|---|---|---|
| 1,600,567 | 9/1926 | Roberts | 146—28 |
| 2,823,717 | 2/1958 | Amori | 146—73 |

W. GRAYDON ABERCROMBIE, *Primary Examiner.*